US009156982B2

(12) United States Patent
Amici et al.

(10) Patent No.: US 9,156,982 B2
(45) Date of Patent: Oct. 13, 2015

(54) POLYAMIDE-BASED THERMOPLASTIC POLYMER COMPOSITIONS

(71) Applicant: RHODIA OPERATIONS, Paris (FR)

(72) Inventors: Marco Amici, Perugia (IT); Cesare Guaita, Tradate (IT)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 14/471,888

(22) Filed: Aug. 28, 2014

(65) Prior Publication Data

US 2015/0045494 A1 Feb. 12, 2015

Related U.S. Application Data

(63) Continuation of application No. 12/527,014, filed as application No. PCT/EP2008/052134 on Feb. 21, 2008, now abandoned.

(30) Foreign Application Priority Data

Feb. 23, 2007 (FR) ...................................... 07 01302

(51) Int. Cl.

| | |
|---|---|
| ***C08L 77/00*** | (2006.01) |
| ***C08L 77/02*** | (2006.01) |
| ***C08L 77/06*** | (2006.01) |
| ***C08G 81/02*** | (2006.01) |
| ***C08L 33/08*** | (2006.01) |
| ***C08L 35/00*** | (2006.01) |
| *C08L 23/08* | (2006.01) |
| *C08L 33/20* | (2006.01) |

(52) U.S. Cl.

CPC ................. *C08L 77/06* (2013.01); *C08L 33/08* (2013.01); *C08L 35/00* (2013.01); *C08L 77/02* (2013.01); *C08L 23/0869* (2013.01); *C08L 23/0884* (2013.01); *C08L 33/20* (2013.01)

(58) Field of Classification Search

CPC ..... C08L 77/02; C08L 77/06; C08L 23/0869; C08L 23/0884; C08L 33/20; C08L 2666/04; C08L 2666/06

See application file for complete search history.

(56) References Cited

U.S. PATENT DOCUMENTS

| | | | | |
|---|---|---|---|---|
| 4,404,325 A * | 9/1983 | Mason et al. | ................. | 525/179 |
| 4,945,129 A * | 7/1990 | Mason et al. | .................. | 525/66 |
| 6,077,905 A | 6/2000 | Perret et al. | | |
| 6,525,166 B1 | 2/2003 | Di Silvestro et al. | | |
| 6,864,354 B2 | 3/2005 | Peduto et al. | | |
| 6,930,165 B2 | 8/2005 | Peduto et al. | | |
| 2005/0008842 A1 | 1/2005 | Peduto et al. | | |
| 2006/0116475 A1 | 6/2006 | Leibler et al. | | |

FOREIGN PATENT DOCUMENTS

| | | |
|---|---|---|
| CA | 2319850 | 3/2002 |
| CA | 2512965 A1 | 8/2004 |
| CN | 1305505 A | 7/2001 |
| FR | 2747391 A1 | 10/1997 |
| FR | 2779730 A1 | 12/1999 |
| FR | 2810332 A1 | 12/2001 |
| FR | 2833015 A1 | 6/2003 |
| JP | 10-60264 A | 3/1998 |
| JP | 2005-145996 A | 6/2005 |
| WO | 00/58403 A1 | 10/2000 |

OTHER PUBLICATIONS

English Machine Translation of WO 00/58403.

* cited by examiner

*Primary Examiner* — Ana Woodward

(57) ABSTRACT

Polyamide-based thermoplastic polymer compositions that exhibit a good balance among the properties thereof, in particular their mechanical properties, and a high fluidity in the molten state; such compositions contain at least one high-fluidity polyamide and a shock modification agent having functional groups that react with the polyimide.

12 Claims, No Drawings

POLYAMIDE-BASED THERMOPLASTIC POLYMER COMPOSITIONS

CROSS-REFERENCE TO EARLIER APPLICATIONS

This application is a continuation of U.S. patent application Ser. No. 12/527,014, filed Jan. 20, 2010, now abandoned, which is the national phase of PCT/EP2008/052134, filed Feb. 21, 2008 and designating the United States (published in the French language on Sep. 12, 2008, as WO 2008110734 A1; the title and abstract were also published in English), which claims priority under 35 U.S.C. §119 of FR 0701302, filed Feb. 23, 2007, each hereby expressly incorporated by reference in its entirety and each assigned to the assignee hereof.

The present invention relates to a polyamide-based thermoplastic polymer composition that exhibits a good balance between its properties, in particular its mechanical properties, and a high melt flow. The invention relates in particular to a composition comprising at least one high-fluidity polyamide and an impact modifier comprising functional groups that react with the polyamide, and to a method for preparing such a composition.

PRIOR ART

Among the properties that it is often desire-duo control in the case of a thermoplastic intended to be formed by techniques such as injection molding, gas injection molding, extrusion and extrusion-blow molding, mention may be made of stiffness, impact strength, dimensional stability, in particular at a relatively high temperature, low post-forming shrinkage, a capacity for coating by various processes, surface appearance and density. These properties can be controlled, within certain limits, through the choice of a polymer or through the addition to the polymer of compounds of various natures. In the latter case, the term polymeric compositions is used. The choice of a material for a given application is generally guided by the required level of performance with respect to certain properties and by its cost. The aim is always to obtain new materials that can meet a specification in terms of performance and/or cost. Polyamide is, for example, a material that is widely used, in particular in the sector of the automobile industry.

Polyamide is a polymer which is chemically resistant, which is stable at high temperatures and which can be mixed with other types of polymers in order to modify the properties thereof. It is, for example, possible to improve its resilience by adding an elastomeric polymer.

There are at least three major properties that it is desired to obtain these polyamide-based compositions, in particular when they are used in these conversion processes.

The first of these properties lies in the fact that these thermoplastic compositions used should be characterized, in the melting state, by a fluidity and a rheological behavior compatible with the forming processes of interest, such as injection molding. Specifically, these thermoplastic compositions should be sufficiently fluid, when they are molten, for it to be possible to easily and rapidly convey and manipulate them in certain forming devices, such as, for example, injection molding devices.

It is also sought to increase the mechanical properties of these compositions. These mechanical properties are in particular the impact strength, the flexural or tensile modulus, the flexural strength or tensile strength, inter alia. Reinforcing fillers, such as glass fibers, are generally used to this effect.

Finally, in the case of components molded from these thermoplastic compositions, a clean and uniform surface appearance is desired. This constraint becomes a problem which is difficult to solve, particularly when a thermoplastic composition with a high load of glass fibers is used, these glass fibers detrimentally affecting the surface appearance of the molded components. It is known practice, in order to obtain an acceptable surface appearance, to use thermoplastic compositions that exhibit a high fluidity. However, this increase in fluidity results in a decrease in the mechanical properties of the articles obtained.

The result is thus that it is difficult to obtain these various properties for the same polyamide-based thermoplastic composition.

INVENTION

The applicant has developed a polyamide composition that exhibits an increased melt flow and equivalent or superior mechanical properties, in comparison with conventional polyamide compositions, and that makes possible the preparation of articles having an excellent surface appearance, in particular when they comprise a high level of fillers.

The subject of the invention is thus a composition comprising at least:

a) a polyamide of type 6 or 66 obtained by means of a process of polymerization of the monomers of the polyamide 6 or 66 in the presence, in addition, of monofunctional and/or difunctional compounds comprising carboxylic acid or amine functions; said polyamide having a melt flow index of greater than or equal to 10 g/10 min. according to the ISO1133 standard measured at a temperature of 275° C. with a load of 325 g; and b) an impact modifier comprising functional groups that react with the polyamide a).

DETAILED DISCLOSURE OF THE INVENTION

The polyamide a) may be a thermoplastic polyamide of type 66, i.e. a polyamide obtained at least from adipic acid and hexamethylenediamine, which may optionally comprise other polyamide monomers.

The term "polyamide of type 66" is intended in particular to mean a polyamide comprising at least 80 mol %, preferably at least 90 mol % of adipic acid and hexamethylenediamine monomer residues.

The polyamide a) may be a thermoplastic polyamide of type 6, i.e. a polyamide obtained at least from caprolactam, which may optionally comprise other polyamide monomers.

The term "polyamide of type 6" is intended in particular to mean a polyamide comprising at least 80 mol %, preferably at least 90 mol % of caprolactam monomer residues.

Preferably, the polyamide according to the invention has a molecular weight Mn of between 3000 and 25000 g/mol, more preferably between 5000 and 15000. It may have a polydispersity index (D=Mw/Mn) of less than or equal to 2.

The polymerization of the polyamide of the invention is in particular carried out according to the conventional operating conditions for the polymerization of polyamides, continuously or batchwise.

Such a polymerization process may comprise, briefly:

heating the mixture of monomers and water, with stirring and, under pressure; and maintaining the mixture at this temperature for a given period of time, followed by decompression and maintaining, for a given period of time, at a temperature above the molting point of the mixture, in particular under nitrogen or under vacuum, so as to thus continue the polymerization by removal of the water formed.

At the end of polymerization, the polymer can be cooled advantageously with water, and extruded in the form of rods. These rods are cut up so as to produce granules.

According to the invention, the polyamide is produced by adding during polymerization, in particular at the beginning of the polymerization, monomers of the polyamides 6 or 66, in the presence, in addition, of difunctional and/or monofunctional compounds. These difunctional and/or monofunctional compounds have amine or carboxylic acid functions capable of reacting with the polyamide monomers. The difunctional compounds may have the same amine or carboxylic acid functionality.

The difunctional and/or monofunctional compounds used are agents for modifying the chain length of polyamides of type 6 or 66 and make it possible to obtain polyamides having a melt flow index of greater than or equal to 10 g/10 min. according to the ISO1133 standard measured at a temperature of 275° C. with a load of 325 g.

The polyamide-6 monomers are in particular adipic acid and hexamethylenediamine, or hexamethylenediamine adipate, also called nylon salt or N salt. The polyamide-6 monomers are caprolactam or derivatives thereof.

It is possible to use, at the beginning, during or at the end of polymerization, aliphatic or aromatic, monocarboxylic or dicarboxylic acids of any type or aliphatic or aromatic, monoamines or diamines of any type. It is in particular possible to use, as monofunctional compound, n-hexadecylamine, n-octadecylamine and n-dodecylamine, acetic acid, lauric acid, benzylamine and benzoic acid. It is in particular possible to use as difunctional compound, succinic acid, terephthalic acid, isophthalic acid, sebacic acid, azelaic acid, dodecanoic acid, fatty acid dimers, di(β-ethylcarboxy)cyclohexanone, 5-methyl pentamethylenediamine, metaxylylenediamine, isophorone diamine and 1,4-cyclohexanediamine.

It is also possible to use an excess of adipic acid or an excess of hexamethylenediamine for the production of a polyamide of type 66 that exhibits a high melt flow.

Preferably, the proportion of acid end groups is different than the proportion of amine end groups, in particular at least twice as many or half as many. The amounts of amine and/or acid end groups are determined by potentiometric assays after dissolution of the polyamide. A method is, for example, described in "Encyclopedia of industrial Chemical Analysis", volume 17, page 293, 1973.

Preferably, the polyamide according to the invention has a melt flow index, according to the ISO1133 standard measured at a temperature of 275° C. with a load of 325 g, of between 10 and 50 g/10 min., more preferably between 20 and 40 g/10 min.

According to the invention, the term "impact modifier" is intended to mean a compound capable of modifying the impact strength of a polyamide composition. These impact-modifier compounds comprise functional groups that react with the polyamide a).

According to the invention, the expression "functional groups that react with the polyamide a)" is intended to mean groups capable of reacting or of interacting chemically with the acid or amine functions of the polyamide, in particular by covalence, ionic or hydrogen interaction or van der Walls bonding. Such reactive groups make it possible to provide good dispersion of the impact modifiers in the polyamide matrix. Good dispersion in the matrix is generally obtained with impact-modifier particles having a size of between 0.1 and 1 μm.

The impact modifiers may very well comprise, in themselves, functional groups that react with the polyamide a), for example as regards ethylene acrylic acid (EAA).

It is also possible to attach thereto functional groups that react with the polyamide a), generally by grafting or copolymerization, for example for ethylene-propylene-diene (EPDM) grafted with maleic anhydride.

According to the invention, use may be made of the impact modifiers, which are oligomeric or polymeric compounds, comprising at least one of the following monomers, or a mixture thereof: ethylene, propylene, butene, isoprene, diene, acrylate, butadiene, styrene, octene, acrylonitrile, acrylic acid, methacrylic acid, vinyl acetate, vinyl esters such as acrylic and methacrylic esters, and glycidyl methacrylate.

The compounds according to the invention may also comprise, in addition, monomers other than those mentioned above.

The base of the impact-modifier compound, optionally referred to as elastomeric base, can be chosen from the group comprising polyethylenes, polypropylenes, polybutenes, polyisoprenes, ethylene-propylene rubbers ethylene-propylene-diene rubbers (EPDMS), ethylene butene rubbers, ethylene acrylate rubbers, butadiene styrene rubbers, butadiene acrylate rubbers, ethylene octene rubbers, butadiene acrylonitrile rubbers, ethylene acrylic acids (EAAs), ethylene vinyl acetate (EVAs), ethylene acrylic esters (EEAs), acrylonitrile-butadiene-styrene (ABS) copolymers, styrene-ethylene-butadiene-styrene (SEBS) block copolymers, styrene-butadiene-styrene (SEE) copolymers, core-shell elastomers of methacrylate-butadiene-styrene (MES) type, or blends of at least two elastomers listed above.

In addition to the groups listed above, these impact modifiers may also comprise, generally grafted or copolymerized, functional groups that react with the polyamide a), such as, in particular, functional groups as follows acids, such as carboxylic acids, salified acids, esters, in particular acrylates and methacrylates, ionomers, glycidyl groups, in particular epoxy groups, glycidyl esters, anhydrides, in particular maleic anhydrides, male imides, or mixtures thereof.

Such functional groups on the elastomers are, for example, obtained by using a comonomer during the preparation of the elastomer.

As impact modifiers comprising functional groups that react with the polyamide a), mention may in particular be made of ethylene/acrylic ester/glycidyl methacrylate terpolymers, ethylene/butyl ester acrylate copolymers, ethylene/n-butyl acrylate/glycidyl methacrylate copolymers, ethylene/maleic anhydride copolymers, maleic anhydride-grafted styrene/maleimide copolymers, copolymers of styrene/ethylene/butylene/styrene modified with maleic anhydride, maleic anhydride-grafted copolymers, maleic anhydride-grafted acrylonitrile/butadiene/styrene copolymers, and hydrogenated versions thereof.

The proportion by weight of the elastomers b) of the invention in the total composition is in particular between 0.1% and 50%, preferably between 0.1% and 20%, in particular between 0.1% and 10%, in particular the values 1, 2, 3, 4, 5, 6, 7, 8, 9 or 10 or any ranges composed of said values, in particular between 1% and 6%.

In order to improve the mechanical properties of the composition according to the invention, it may be advantageous to add thereto at least one reinforcing and/or bulking filler preferably chosen from the group comprising fibrous fillers such as glass fibers, inorganic fillers such as clays, kaolin, or reinforced nanoparticles or nanoparticles made of thermosetting material, and powder fillers such as talc. The degree of incorporation of reinforcing and/or bulking filler is in accordance with the standards in the composite material field, it may, for example, be a degree of filler of from 1% to 50% by weight, relative to the total weight of the composition.

The composition may comprise, in addition to the modified polyamide of the invention, one or more other polymers, preferably polyamides or copolyamides.

The composition according to the invention may also comprise additives normally used for the production of polyamide compositions. Thus, mention may be made of lubricants, flame retardants, plasticizers, nucleating agents, catalysts, agents for improving impact strength, such as optionally grafted elastomers, light and/or heat stabilizers, antioxidants, antistatics, colorants, mattifying agents, molding aids or other conventional additives.

These fillers and additives can be added to the modified polyamide by standard means suited to each filler or additive, such as, for example, during melt blending or polymerization.

The thermoplastic compositions are generally obtained by mixing the various compounds that go to make no the composition, the thermoplastic compounds being in molten form. The process is carried out at more or less high temperature, and at more or less high shear force depending on the nature of the various compounds. The compounds can be introduced simultaneously or successively. An extrusion device in which the material is heated, subjected to a shear force and conveyed along, is generally used. Such devices are entirely known to those skilled in the art.

According to a first embodiment, all the compounds are melt blended during a single operation, for example during an extrusion operation. It is, for example, possible to blend granules of the polymeric materials, and to introduce them into the extrusion device in order to melt them and to subject them to a more or less large shear stress.

According to particular embodiments, it is possible to prepare preblends, which may or may not be melt pre blends, of some of the compounds before preparation of the final composition.

The composition according to the invention, when it is prepared using an extrusion device, is preferably conditioned in the form of granules. The granules are intended to be formed by means of processes involving melting so as to obtain articles. The articles are thus made up of the composition. According to one customary embodiment, the modified polyamide is extruded in the form of rods, for example in a twin-extrusion device, and said rods are then cut into granules. The molded components are then prepared by melting the granules produced above and feeding the molten composition into injection molding devices.

The use of the compositions according to the invention is particularly advantageous in the context of the manufacture of articles for the automobile or electrical industry, in particular for the molding of components of large sizes or with a complex geometry.

Specific terms are used in the description in such a way as to facilitate understanding of the principle of the invention. It should nevertheless be understood that no limitation of the scope of the invention is envisioned with the use of these specific terms. The term "and/or" includes the meanings and, or, and also all the other possible combinations of elements connected to this term.

Other details or advantages of the invention will emerge more clearly in view of the examples below, given only by way of indication.

Experimental Section

The following compounds are used:

PA1: Polyamide 66 having an MFI of 2.7 g/10 minutes (according to the ISO1133 standard measured at 27.5° C. with a load of 325 g) and an IV of 140. Contents of following end groups: amine end groups=40 meg/kg, carboxylic end groups=60 meq/kg, PA2: Polyamide 66 having an IV of 30 g/10 minutes (according to the ISO1133 standard measured at 275° C. with a load of 325 g) and an IV of 98. Contents of following end groups: amine end groups 28 meg/kg, carboxylic end groups=90 meq/kg. Obtained by adding 0.7 mol % of benzoic acid at the beginning of Polymerization.

Glass fibers: Vetrotex 99B.

E1: ethylene/acrylicester/glycidyl methacrylate terpolymer elastomer (8% by weight of glycidyl methacrylate), sold under the name Lotader® AX9900 by the company Arkema.

E2: ethylene/butyl ester acrylate copolymer elastomer, sold under the name Lotryl® 30 BA 02 by the company Atofina.

E3: ethylene/n-butyl acrylate/glycidyl methacrylate copolymer elastomer, sold under the name Elvaloyl® PTW by the company DuPont.

E4: ethylene/maleic anhydride copolymer elastomer, sold under the name Exxelor® VA 1840 by the company Exxon Mobil.

E5: ethylene/maleic anhydride copolymer elastomer, sold under the name Fusabone® N MN493D by the company DuPont.

E6: ethylene/acrylic acid copolymer elastomer, sold under the name Primacor® EAA 449 by the company Dow.

E7: ethylene/vinyl acetate copolymer elastomer, sold under the name Escorene® UL 02528 by the company Exxon Mobil.

Additives: EFS wax, and nigrosine sold under the name 54/1033 by the company Ferroplast.

The compositions are prepared by melt blending, using a Werner and Pfleiderer 25K twin-screw extruder, the polyamides, 5% by weight of elastomers, 30% by weight of glass fibers, and 1.3% by weight of additives. The extrusion conditions are the following: temperature: between 240 and 280° C., rotation speed: between 200 and 300 rpm, flow rate between 25 and 60 kg/hour.

The various compositions prepared are shown in Table 1:

TABLE 1

| Examples | Polymer | Elastomer | Spiral test (cm) | Unnotched Charpy impact (KJ/m$^2$) |
|---|---|---|---|---|
| C1 | PA1 | — | 25 | 86.3 |
| C2 | PA1 | E1 | 24 | 89.7 |
| C3 | PA2 | — | 46 | 58.2 |
| 1 | PA2 | E1 | 47 | 82.2 |
| 2 | PA2 | E3 | 45 | 84.4 |
| 3 | PA2 | E4 | 45 | 88.1 |
| 4 | PA2 | E5 | 44 | 88.8 |
| 5 | PA2 | 30% E1 + 70% E2 | 45 | 86.8 |
| 6 | PA2 | 15% E1 + 85% E2 | 46 | 80.8 |
| 7 | PA2 | E6 | 41 | 78.8 |
| 8 | PA2 | E7 | 46 | 79.7 |

The unnotched Charpy impact strength is measured according to ISO standard 179/1 eU.

The spiral test makes it possible to quantify the fluidity of the compositions by melting the granules and injecting them into a spiral-shaped mold with a semicircular cross section of thickness 2 mm and of width 4 cm, in a BM-Biraghi 85T press at a barrel temperature of 275° C. and a mold temperature of 80° C. and with a maximum injection pressure of 130 bar, which corresponds to an injection of approximately 0.4 seconds (the result is expressed as length of mold correctly filled by the composition).

It is thus observed that the compositions obtained exhibit excellent compatibilization between the polyamide of the invention and the grafted elastomers, thereby resulting in the obtaining of articles having an excellent balance between mechanical properties and melt flow. It is, moreover, observed that the articles of Examples 1-8 exhibit a good surface appearance.

The invention claimed is:

1. A polymer composition comprising:

a) a polyamide 6 or 66 obtained via a process of polymerization of monomers of polyamide 6 or 66, in the presence of a monofunctional compound comprising n-hexadecylamine, n-octadecylamine, n-dodecylamine, acetic acid, lauric acid, benzylamine or benzoic acid, and/or a difunctional compound comprising succinic acid, terephthalic acid, isophthalic acid, sebacic acid, azelaic acid, dodecanoic acid, fatty acid dimers, di(β-ethylcarboxy)cyclohexanone, 5-methyl pentamethylenediamine, metaxylylenediamine, isophorone diamine or 1,4-cyclohexanediamine, said polyamide 6 being a polyamide comprising at least 80 mol % of recurring units derived from caprolactam monomer, said polyamide 66 being a polyamide comprising at least 80 mol % of recurring units derived from adipic acid and hexamethylenediamine monomers, said polyamide having a melt flow index of greater than or equal to 10 g/10 min. according to the ISO1133 standard measured at a temperature of 275° C. with a load of 325 g; and b) at least one impact modifier selected from the group consisting of ethylene/acrylic ester/glycidyl methacrylate terpolymers, ethylene/n-butyl acrylate/glycidyl methacrylate copolymers, and ethylene/maleic anhydride copolymers.

2. The polymer composition as defined by claim 1, wherein the molecular weight Mn of the polyamide ranges from 5,000 g/mol to 15,000 g/mol.

3. The polymer composition as defined by claim 1, wherein the polyamide has a polydispersity index less than or equal to 2.

4. The polymer composition as defined by claim 1, wherein the polyamide has a melt flow index ranging from 10 to 50 g/10 min.

5. The polymer composition as defined by claim 1, wherein the polyamide has a melt flow index ranging from 20 to 40 g/10 min.

6. The polymer composition as defined by claim 1, wherein the proportion of the at least one impact modifier present therein ranges from 0.1% to 10% by weight of the total composition.

7. The polymer composition as defined by claim 1, comprising at least one reinforcing and/or bulking filler.

8. A method for producing a polymer composition as defined by claim 1, comprising melt blending said polyamide a) and said impact modifier b).

9. The polymer composition of claim 1, wherein the difunctional compound is present in an excess, based on the stoichiometry, during the polymerization of the monomers.

10. The polymer composition as defined by claim 1, wherein said polyamide 6 or 66 comprises acid terminal end groups and amine terminal end groups, the proportion of acid terminal end groups is different than the proportion of amine terminal end groups and the ratio of acid terminal end groups/amine terminal end groups is ≥2 or ≤0.5.

11. The polymer composition as defined by claim 1, wherein the composition has an unnotched Charpy impact of 78.8 to 88.8 $KJ/m^2$, when measured according to ISO standard 179/1 eU.

12. The polymer composition as defined by claim 1, wherein when the composition is tested in a spiral test by melting the granules and injecting them into a spiral-shaped mold with a semicircular cross section of thickness 2 mm and of width 4 cm, in a BM-Biraghi 85T press at a barrel temperature of 275° C. and a mold temperature of 80° C. and with a maximum injection pressure of 130 bar, the length of the mold filled by the composition is from 41 cm to 47 cm.

* * * * *